April 11, 1944.     J. A. BOMBARDIER     2,346,351
CHAIN TREAD VEHICLE
Filed July 6, 1942     2 Sheets-Sheet 1
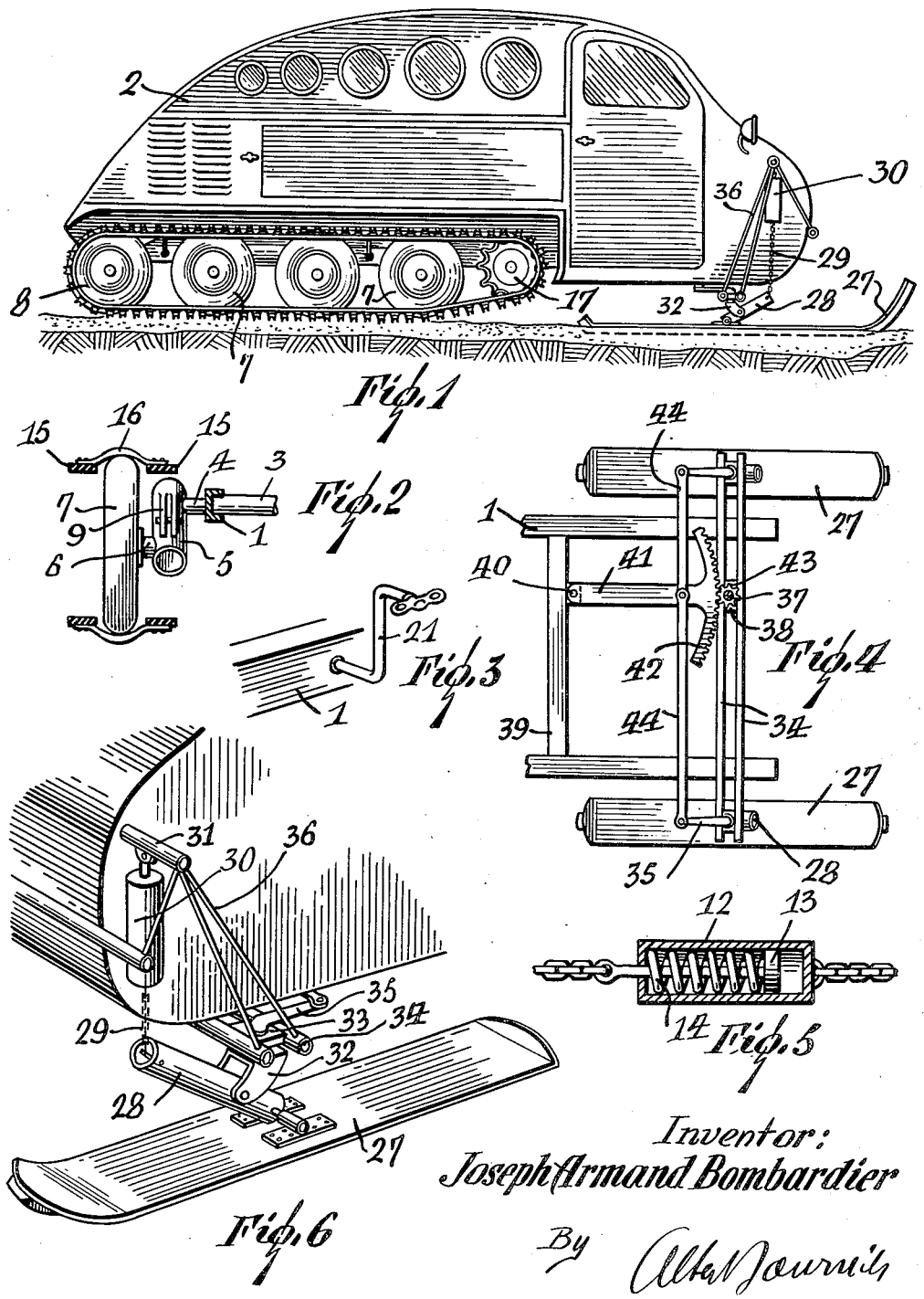
Inventor:
Joseph Armand Bombardier April 11, 1944. J. A. BOMBARDIER 2,346,351
CHAIN TREAD VEHICLE
Filed July 6, 1942 2 Sheets-Sheet 2
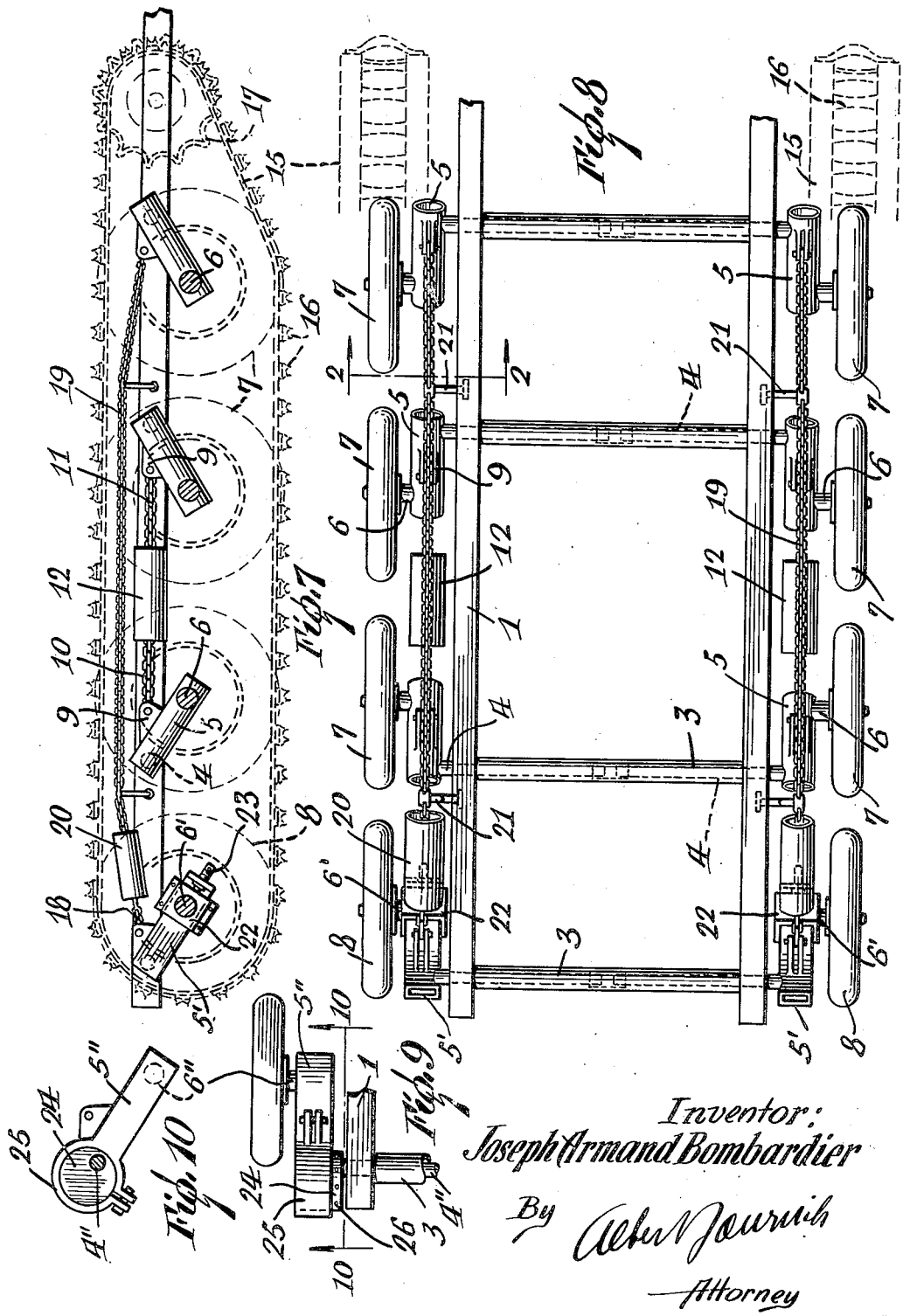
Inventor:
Joseph Armand Bombardier
By
Attorney Patented Apr. 11, 1944

2,346,351

UNITED STATES PATENT OFFICE 2,346,351

CHAIN TREAD VEHICLE

Joseph Armand Bombardier, Valcourt, Quebec, Canada

Application July 6, 1942, Serial No. 449,852
In Canada March 30, 1942

6 Claims. (Cl. 305—9)

The present invention pertains to novel improvements in tread chains for endless tread vehicles such as auto sleds.

The principal object of the invention is to provide an improved individual suspension of each wheel comprised in the tread chain. Another object is to provide simple and improved steering mechanism for the runners at the forward end of the vehicle.

Still another object of the invention is to provide a means for adjusting the tension of the endless tread chain and to adjust the position of its idler wheel. These various objects are accomplished by simple and economical construction, as will appear in the development of the description.

The first named object is accomplished by the use of a pivoted supporting arm for each wheel and drive pulley in the chain. These arms and their respective wheels are under constant spring tension in such a manner that the latter members tend to occupy a relatively fixed position, as distinguished from other constructions in which the wheel members are displaced with a great deal of useless and lost motion in the movement of the vehicle.

The steering of the runners is accomplished by means of rods joined to a toothed sector actuated from the steering wheel, these rods being shifted transversely during the steering operation and connected to the runners in a manner to alter the direction of the latter as desired.

For the adjustment of the tread chain, one of the wheels and preferably the drive pulley at each side of the vehicle, has its axle carried by a slide member or by an eccentric disc, whereby the axle and the member carried thereby can be moved relatively to the remaining wheels within the chain. This adjustment is employed not only in the original assembling of the device, but also later to compensate for looseness resulting from use. Moreover, the disc, also serves as a means for raising the drive pulley particularly when the vehicle is to be driven in reverse for any considerable distance.

The invention is fully disclosed by way of example in the following description and in the accompanying drawings in which:

Figure 1 is an elevation of a vehicle according to the invention;

Figure 2 is a section on the line 2—2 of Figure 8;

Figure 3 is a perspective view of one of the auxiliary supports;

Figure 4 is a plan view showing the steering mechanism and the runners;

Figure 5 is a detail section showing one of the cylinders and a spring pressed piston therein;

Figure 6 is a perspective view at one of the forward corners of the vehicle to illustrate the mounting of the runners;

Figure 7 is a longitudinal section illustrating the individual suspension of the wheels;

Figure 8 is a plan view of the chassis;

Figure 9 is a detail illustrating a modified construction for adjusting the axle of the drive pulley, and Figure 10 is a section on the line 10—10 of Figure 9.

Reference to these views will now be made by use of like characters which are employed to designate corresponding parts throughout.

The chassis of the vehicle consists of longitudinal frame members 1 which support the body 2, the chains and the steering gear. The longitudinal members 1 together with transverse frame members (not illustrated) form the chassis. These longitudinal members are U-shaped in cross section, as shown in Figure 2, and receive pivoted arms which will presently be described. The members 1 are additionally joined transversely by tubular members 3, as also shown in Fig. 2. In each of these tubes are placed two shaft sections 4 which are separable from each other at the mid-point of the tubular member as shown in Figure 8. These shafts are extended outwardly beyond the members 1, and each extended end has a tube 5 secured thereto at a right angle to form the previously mentioned pivoted arm. The joint is made near one end of the tube 5, and from the point near the other end of the tube is secured a stub shaft 6 extending parallel to the extension 4. On each stub shaft is mounted wheel 7 except at the rear end of the series, where idler wheels 8 are mounted, as indicated in Figures 1, 7 and 8. The members 7 and 8 are of the same size and construction, each comprising a metal wheel provided with a tire.

As shown more clearly in Figure 7, the tubes 5 serve as levers and are normally placed obliquely to the horizontal because of a tension therein which will presently be described.

Each tube 5 is provided with two parallel ears 9 at a short distance from the shaft 4. The ears of the tubes at the center of the chain are face to face since these tubes slope in opposite directions. The ears of these tubes are joined by two chains 10 and 11, one of which is secured to the end of a cylinder 12 and the other to a piston 13 mounted in the cylinder. The spring 14 mounted in the cylinder and behind the piston tends to move the piston towards the closed end of the cylinder in order to tighten the chains 10 and 11. This construction is illustrated particularly in Figure 5. It may be assumed that the tension of the spring is constant so that the chains 10 and 11 are always taut and consequently the shafts 4 are normally in horizontal alinement with the points at which the chains are attached to the ears 9. If the vehicle carries a load, the alinement is destroyed but is restored as soon as the load is removed. If the vehicle is lifted, the parts remain in line as above and consequently the variations in the level of the road or ground do not cause any idle oscillations of the wheels 7, the weight of the vehicle and its load being equally distributed over its length.

The traction chain consists of two bands 15 of rubber placed parallel to each other, there being one such pair at each side of the vehicle. The bands of each pair are connected at intervals by transverse bars 16 shaped to form road gripping teeth or treads, as shown in Figures 7 and 8. The bars 16 are engaged by the teeth of sprocket wheels 17 at one end of the series of wheels. The wheels 7 and 8 lie between the bands of each pair and engage the upper and lower bars 16 rather snugly as shown in Figure 2.

Referring again to the suspension, it is noted that the wheels are grouped in pairs therefore the tube 5 of the idler-wheel 8 and the forward wheel 7, next to the sprocket 17, are joined by two chains 18 and 19 and a cylinder 20 containing a piston and a spring as described in connection with the cylinder 12. Since the chains 10 and 11 might come in contact with the chains 18 and 19, the latter are mounted at a distance above the former by reason of the two vertical supports 21 in the form of doubly bent rods pivotally attached to the members 1 as shown in Figure 3. These supports, provided near both ends of the chain 19, are attached to the chain and swing on their pivots as the chain moves.

Although the chain 19 is above chains 10 and 11 the alinement of axis and chain is however maintained between the shafts and the tension of the chains. If the traction chain comprises more wheels than shown in the drawings, that is, six or eight or ten instead of four, the suspension is established in the same manner, in pairs or an even number of wheels.

The idler-wheel 8 may be adjustably mounted with reference to its shaft 4. This is illustrated in Figures 7 and 8 and in another embodiment in Figures 9 and 10. The object of this adjustment is to provide tension of the bands 15 during assembly and also to compensate for the stretching in use. The construction shown in Figures 9 and 10 comprises moreover a means of changing the position of the shaft 4 with reference to the pivoted arm in such a manner that the position of the idler-wheel 8 may be raised or lowered as required. This permits placing the idler-pulley 8 higher than the wheels 7 when it is necessary to move the vehicle in reverse.

The tube 5' illustrated in Figures 7 and 8 is square and receives a slide 22 on which is fixed a stub shaft 6'.

The slide 22 is made in two parts, fastened together by bolts and screws so that it may be secured or removed as required. The slide is fixed to the tube by tightening the screws. When the screws are released, the slide may be moved by means of an adjustment or set screw 23 mounted on tube 5'.

In the modification shown in Figures 9 and 10, the axle 4'' is mounted eccentrically on a disc 24 to which is fixed an arm 5'' by means of a collar 25. The arm 5'', like the tubes 5, is provided with a stub shaft 6''. In order to adjust the position of the member 5'', the collar 25 is loosened and the disc 24 is turned by a pointed member inserted in the holes 26 formed in the periphery of the disc 24. When the proper position has been determined, the collar 25 is tightened in order to hold all the parts together.

The invention also comprises, as stated above, certain improvements at the forward end of the vehicle. Among these is the provision of a pair of runners 27 which are directed for steering in a practical and simple manner.

Near the center of each runner is pivotally mounted the end of a stem or tube 28 (Fig. 6) which operates as a lever and which is normally in an oblique position. This member is suspended from its upper end by a chain 29 attached to a piston (not shown) mounted in a cylinder 30, carrying a spring in the same manner as the cylinder 12. The cylinder 30 is suspended from a transverse shaft 31.

Near its midpoint the tube 28 carries a fork 32 which receives the weight of the front end of the vehicles and follows the direction of the runner 27 therebeneath. In order to provide a pivot for the fork 32, an apertured plate 33 is mounted between two transverse shafts 34. The shafts 34 are fixed to the longitudinal members 1. A lever 35 which is horizontal and parallel to the runner 27 is shaped to pass through the hole in the member 33 and is fixed to the fork 32. Obviously, roller bearings may be placed between the plate 33 and the top of the fork 32 to reduce the friction. In order to render the members 31 and 34 more rigid, their ends are joined by metal rods 36.

The steering gear of the vehicle, illustrated in part, comprises a shaft 37 as shown in Figure 4, the lower end of which is rotatably mounted in a plate 38 secured to the transverse shafts 34. A transverse frame member 39 a short distance from the shafts 34 and parallel thereto has a horizontal arm 41 pivoted thereto at 40, extending towards the shaft 37 and terminating in a toothed sector 42 meshing with a pinion 43 keyed to the shaft 37. The arm 41 is moreover secured, at a point near the sector 42, to the joined inner ends of rods 44 which form a connecting linkage between the levers 35, as shown in Figure 4.

In order to steer the vehicle, the steering wheel (not shown) is turned and with it the pinion 43 which engages the sector 42 and thereby causes the arm 41 to swing. Since the arm is pivotally attached to the rods 44 as above set forth, the movement is transmitted to the levers 35 and thence through the forks 32 to the runners 27.

Referring again to the wheels, it is noted that they are individually suspended notwithstanding that they are joined in pairs. The use of tubular members in several parts of the construction, has been found more advantageous than solid rods and likewise more flexible in addition to the fact that they are lighter and require less metal.

Although specific embodiments of the invention have been illustrated and described, it will be understood that various alterations in the details of construction may be made without departing from the scope of the invention as indicated by the appended claims.

What I claim is:

1. In a vehicle of the chain tread type, a chassis, a series of wheels, an endless traction chain trained over said wheels, a supporting arm for each wheel, each arm being pivotally attached to said chassis and rotatably supporting one of said wheels at a distance from the point of pivotal attachment, said arms being grouped in pairs, a cylinder and a spring-pressed piston therein between the arms of each pair, and chains connecting the cylinder and piston respectively to the arms of the corresponding pair.

2. In a vehicle of the chain tread type, a chassis, a series of wheels, an endless traction chain trained over said wheels, a supporting arm for each wheel, each arm being pivotally attached to said chassis and rotatably supporting one of said wheels at a distance from the point of pivotal attachment, spring means connecting said arms in pairs to maintain said arms under tension, and means for adjusting one of said wheels for tensioning said traction chain.

3. In a vehicle of the chain tread type, a chassis, a series of wheels, an endless traction chain trained over said wheels, a supporting arm for each wheel, each arm being pivotally attached to said chassis and rotatably supporting one of said wheels at a distance from the point of pivotal attachment, spring means connecting said arms in pairs to maintain said arms under tension, another wheel entrained by said chain and constituting a drive pulley for said chain, and means for adjusting one of the end wheels of said series for tensioning said traction chain.

4. In a vehicle of the chain tread type, a chassis, a series of wheels, an endless traction chain trained over said wheels, a supporting arm for each wheel, each arm being pivotally attached to said chassis and rotatably supporting one of said wheels at a distance from the point of pivotal attachment, spring means connecting said arms in pairs to maintain said arms under tension, and means for adjusting one of said wheels lengthwise on its arm for tensioning said traction chain.

5. In a vehicle of the chain tread type, a chassis, a series of wheels, an endless traction chain trained over said wheels, a supporting arm for each wheel, each arm being pivotally attached to said chassis and rotatably supporting one of said wheels at a distance from the point of pivotal attachment, and a disc rotatably and adjustably mounted in one of said arms, said disc being eccentrically pivotally attached to said chassis and constituting the pivotal attachment of the last named arm to the chassis.

6. In a vehicle of the chain tread type, a chassis, a series of wheels, an endless traction chain trained over said wheels, a supporting arm for each wheel, each arm being pivotally attached to said chassis and rotatably supporting one of said wheels at a distance from the point of pivotal attachment, a disc rotatably and adjustably mounted in one of said arms, said disc being eccentrically pivotally attached to said chassis and constituting the pivotal attachment of the last named arm to the chassis, and spring means connecting pairs of said arms to maintain said arms under tension.

JOSEPH ARMAND BOMBARDIER.